United States Patent
Dasa et al.

(10) Patent No.: US 11,789,728 B2
(45) Date of Patent: *Oct. 17, 2023

(54) MICRO-FRONTEND AS A SERVICE

(71) Applicant: Capital One Services, LLC, McLean, VA (US)

(72) Inventors: Venkata Sudharsan Dasa, Frisco, TX (US); Jonathan Ricklis, Richardson, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/954,364

(22) Filed: Sep. 28, 2022

(65) Prior Publication Data

US 2023/0027485 A1 Jan. 26, 2023

Related U.S. Application Data

(63) Continuation of application No. 17/189,333, filed on Mar. 2, 2021, now Pat. No. 11,487,540.

(51) Int. Cl.
*G06F 11/07* (2006.01)
*G06F 16/958* (2019.01)
(Continued)

(52) U.S. Cl.
CPC .............. *G06F 9/24* (2013.01); *G06F 8/60* (2013.01); *G06F 9/45529* (2013.01);
(Continued)

(58) Field of Classification Search
CPC .......... G06F 9/24; G06F 8/60; G06F 9/45529; G06F 21/71; H04L 67/1097; H04L 67/34; H04L 67/01
See application file for complete search history.

(56) References Cited

U.S. PATENT DOCUMENTS 9,342,386 B1 * 5/2016 Sargent ................ G06F 9/546
10,331,461 B2 6/2019 Olenick et al.
(Continued)

FOREIGN PATENT DOCUMENTS

CN 109597610 A 4/2019
CN 111176627 A 5/2020
(Continued)

OTHER PUBLICATIONS

Kumar S. G. et al., Dynamic website specific browser menus, 6 pages (Year: 2015).*
(Continued)

*Primary Examiner* — Thuy Dao
(74) *Attorney, Agent, or Firm* — Sterne, Kessler, Goldstein & Fox P.L.L.C.

(57) ABSTRACT

Embodiments disclosed are directed to a system that performs steps to transmit, to a client device, a host application for storage on a browser of the client device. The host application is used to facilitate loading of a micro-frontend application onto the browser at runtime of the host application, for integration with and use in conjunction with the host application. The system also receives, from the host application, a request to load the micro-frontend application onto the browser. Based on receiving the request, a manifest file is accessed indicating a version of the micro-frontend application to be loaded onto the browser. The micro-frontend application is retrieved based on the version indicated in the manifest file and transmitted to the host application for loading onto the browser.

17 Claims, 6 Drawing Sheets

(51) Int. Cl.
*H04L 67/02* (2022.01)
*G06F 9/445* (2018.01)
*H04L 67/568* (2022.01)
*G06F 9/24* (2006.01)
*G06F 21/71* (2013.01)
*G06F 8/60* (2018.01)
*H04L 67/00* (2022.01)
*H04L 67/1097* (2022.01)
*G06F 9/455* (2018.01)
*H04L 67/01* (2022.01)

(52) U.S. Cl.
CPC .......... *G06F 21/71* (2013.01); *H04L 67/1097* (2013.01); *H04L 67/34* (2013.01); *H04L 67/01* (2022.05)

(56) References Cited

U.S. PATENT DOCUMENTS

| | | | |
|---|---|---|---|
| 10,678,600 | B1 | 6/2020 | Darling et al. |
| 11,252,252 | B2* | 2/2022 | Boodman ............... G06F 21/53 |
| 2005/0278718 | A1* | 12/2005 | Griffith ................... G06F 9/445 |
| | | | 717/163 |
| 2018/0052811 | A1 | 2/2018 | Gonzalez del Solar et al. |
| 2019/0163453 | A1 | 5/2019 | Seksenov et al. |
| 2021/0026656 | A1* | 1/2021 | Yu ............................. G06F 8/54 |
| 2021/0303577 | A1 | 9/2021 | Liu et al. |
| 2022/0283805 | A1 | 9/2022 | Dasa et al. |

FOREIGN PATENT DOCUMENTS

| | | |
|---|---|---|
| CN | 111324346 A | 6/2020 |
| CN | 111488145 A | 8/2020 |
| CN | 111581576 A | 8/2020 |
| CN | 111737032 A | 10/2020 |

OTHER PUBLICATIONS

D. F. Some, EmPoWeb: Empowering Web Applications with Browser Extensions, 19 pages (Year: 2019).

* cited by examiner

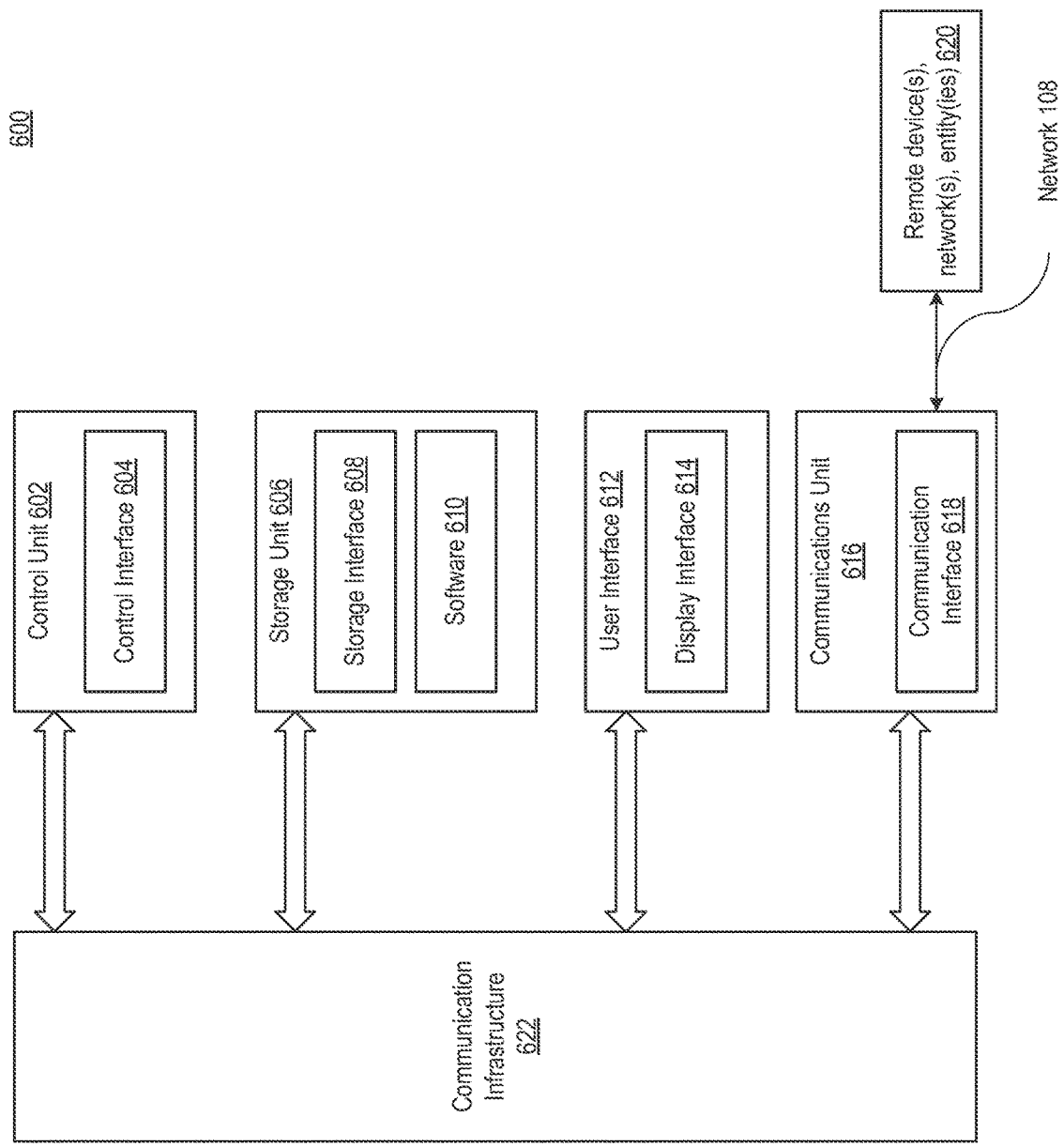

MICRO-FRONTEND AS A SERVICE

CROSS-REFERENCE TO RELATED APPLICATIONS

This application is a continuation of U.S. application Ser. No. 17/189,333, filed on Mar. 2, 2021, the contents of which are incorporated by reference herein.

TECHNICAL FIELD

Embodiments relate to systems that allow for building reusable software components, specifically systems that allow for reuse capability and integration of micro-frontend applications across host applications.

BACKGROUND

Across many large organizations, software development teams build large, complex software applications to meet customer needs. Often, the size and complexity of these applications necessitates that multiple teams work on the same application. To avoid the coordination problems associated with multiple teams working on one monolithic code base, many of these applications should be, and have been, decomposed into smaller, independent, more manageable components. The idea is to develop small independent components that implement common functions for all the teams working on their portion of the software. However, some of the approaches to decomposition (e.g. breaking down applications into micro-applications, and library-based approaches where common libraries of code are created) can introduce their own difficulties. For example, there is a problem of coordination between development teams every time micro-applications or libraries of code are updated because teams have to make sure they are all aware of the latest micro-applications and libraries to incorporate into their own portion of software. Often teams are unaware of latest versions of code to incorporate, and thus portions of the software can refer to one version of the micro-application, while other portions refer to other versions. Thus, systems and methods are needed to address this problem.

SUMMARY

Embodiments disclosed herein provide systems and methods for building reuse capability and integration of micro-frontend applications across host applications. The systems and methods improve conventional systems by implementing architectures that allow searching for and locating correct versions of micro-frontend applications from a cloud computing environment using manifest files. The manifest files store information regarding what versions of the micro-frontend applications to load. As a result, software applications no longer have to search for what version of micro-frontend applications to load and use themselves, but can offload the functionality to the cloud computing environment by simply making calls to manifest files that contains all the information needed. In this way, the correct version of the micro-frontend applications can be used across all applications. In embodiments, the systems can perform the aforementioned functionality by implementing methods to transmit from a cloud computing environment to a client device, a host application for storage on a browser of the client device. In embodiments, the host application can be used to facilitate loading of a micro-frontend application onto the browser at runtime of the host application, for integration with and use in conjunction with the host application. In embodiments, the cloud computing environment can further receive from the host application, a request to load the micro-frontend application onto the browser. In embodiments, based on receiving the request, the cloud computing environment can access a manifest file indicating a version of the micro-frontend application to be loaded onto the browser. In embodiments, the cloud computing environment can retrieve the micro-frontend application based on the version indicated in the manifest file, and transmit to the host application the micro-frontend application for loading onto the browser.

In embodiments, the client device can receive from a cloud computing environment a host application for storage on a browser. In embodiments, the host application may be used to facilitate loading of a micro-frontend application onto the browser at runtime of the host application, for integration with and use in conjunction with the host application. In embodiments, the client device can transmit to the cloud computing environment a request to load the micro-frontend application onto the browser. In embodiments, the client device can receive from the cloud computing environment the micro-frontend application for loading onto the browser, and load the micro-frontend application onto the browser for use in conjunction with the host application.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

FIG. 6 is an example architecture of the components implementing the system according to embodiments.

DETAILED DESCRIPTION

Figure 1:
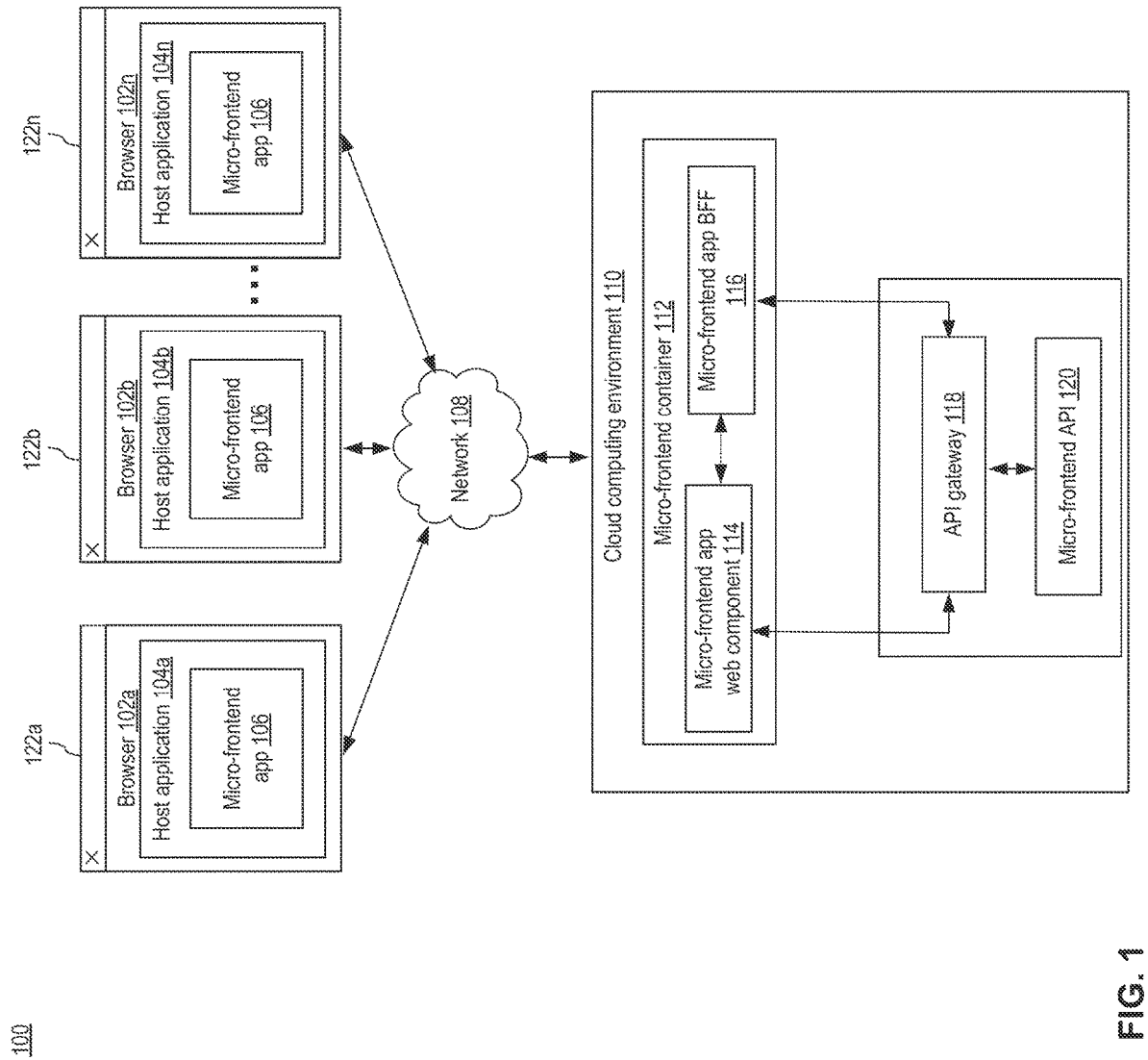
FIG. 1 is an example system for building reuse capability and integration of a micro-frontend application across host applications according to embodiments.

Embodiments disclosed herein relate to a system and method that allows reusable software components to be distributed and deployed to host applications using those reusable components. The system and method allows developers of the host applications to offload the responsibility to manage these reusable components and allows for the reusable components to be loaded automatically and at runtime of the host applications, to be used in conjunction with the host applications.

Embodiments disclosed are directed to a system that performs the aforementioned functions by performing steps to transmit, to a client device, a host application for storage on a browser of the client device. The host application is used to facilitate loading of a micro-frontend application onto the browser at runtime of the host application, for integration with and use in conjunction with the host application. The system also receives, from the host application, a request to load the micro-frontend application onto the browser. Based on receiving the request, a manifest file is accessed indicating a version of the micro-frontend application to be loaded onto the browser. The micro-frontend application is retrieved based on the version indicated in the manifest file, and transmitted to the host application for loading onto the browser.

The following embodiments are described in sufficient detail to enable those skilled in the art to make and use the disclosure. It is to be understood that other embodiments are evident based on the present disclosure, and that system, process, or mechanical changes may be made without departing from the scope of embodiments of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in an embodiment of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

FIG. 1 is an example system 100 according to embodiments. System 100 shows an embodiment implementing a micro-frontend as a service. A micro-frontend as a service refers to a software delivery model in which reusable software components and/or functions are delivered to host applications incorporating those reusable software components and/or functions. Throughout this disclosure, the reusable software components and/or functions will be referred to as micro-frontend applications or a micro-frontend application 106. In some embodiments, the micro-frontend application 106 may also require back-end systems or components to enable its functionality.

In embodiments where back-end systems are required for functioning of the micro-frontend application 106, the micro-frontend as a service may be designed to have its own backend for frontend (BFF) components that may be called to fetch any complex data, or to make service calls to update the data as needed to allow the micro-frontend application 106 to operate properly. In this way, the micro-frontend as a service provides reuse capabilities for both frontend applications (host applications, micro-frontend applications, etc.) with back-end systems and allows the micro-frontend as a service seamlessly integrate and scale as more host applications use its services to integrate micro-frontend applications or the micro-frontend application 106. Using the micro-front end as a service, the host applications will not require any changes which makes integration of host applications with the micro-frontend as a service seamless. How the system 100 operations will be discussed further below.

In some embodiments, system 100 comprises a client device 122 including a browser 102, a host application 104, a micro-frontend application 106, a network 108, and a cloud computing environment 110, including a micro-frontend container 112, an API gateway 118, and a micro-frontend API 120. In one aspect, the micro-frontend container 112 comprises a micro-frontend application web component 114, and micro-frontend application BFF (back-end for frontend) 116. It is to be appreciated that more than one of each device may be used.

In some embodiments, system 100 may be used for building reuse capability and integration of the micro-frontend application 106 (i.e., the reusable software component and/or function) in the host application 104. In FIG. 1, more than one host application 104 is shown. These are shown as {104a, 104b, . . . 104n}. In many embodiments, host application 104 refers to any software application that may be stored, partially or fully, and executed on browser 102 to perform some functionality. By way of example, in many embodiments, the host application 104 may be a web application that may be used by users, via the browser 102, to search for automobiles to purchase, or a web application that may be used by users, via the browser 102, to search for other users interested in purchasing automobiles. The aforementioned are merely exemplary as to what software the host application 104 may be, and is not meant to be limiting.

In many embodiments, the browser 102, and at least a portion of the host application 104, may be stored on client device 122. In FIG. 1, more than one client device 122 is shown. These are shown as {122a, 122b, . . . 122n}. The client device 122 may be any of a variety of centralized or decentralized computing devices. For example, the client device 122 may be a mobile device, a laptop computer, or a desktop computer. The client device 122 can function as a stand-alone device separate from other devices of the system 100. Stand-alone can refer to a device being able to work and operate independently of other devices. For the purposes of FIG. 1, it is assumed that each host application {104a, 104b, . . . 104n} is different from each other and is a separate software application, however, each host application shares at least one functionality, which each host application 104 performs, and that is common among each host application 104. In many embodiments, the common functionality is implemented by a micro-frontend application 106. In many embodiments, each host application 104 can work independently of another host application 104.

In some embodiments, the browser 102 can refer to any web browser that can store the host application 104, and allow the host application 104 to execute thereon. For example, the browser 102 may be Microsoft Internet Explorer™, Microsoft Edge™, Google Chrome™, Apple Safari™, or any similar web browser. FIG. 1 shows more than one browser 102. These are shown as {102a, 102b, . . . 102n}. In many embodiments, the host application 104, or a portion thereof, may be stored in the cache of browser 102, or as application extensions of browser 102. By way of example, if the browser 102 is Google Chrome™, the host application 104, or a portion thereof, may be implemented as a Chrome Extension. If the browser 102 is Microsoft Edge™, the host application 104, or a portion thereof, may be implemented as a Microsoft Edge™ Add-on. In many embodiments, each browser 102 may be the same or different from one another. For example, in many embodiments, browser 102a may be Google Chrome™, while browser 102b may be Microsoft Edge™.

In some embodiments, the micro-frontend application 106 refers to a discrete software that provides some specific functionality for the host application 104. The functionality may be any of a variety of functionalities, for example and without limitation, searching for data, retrieving data, processing data, etc. The micro-frontend application 106 may be implemented in any number of programming languages. For example and without limitation, the micro-frontend application 106 may be implemented in the JavaScript programming language. In many embodiments, in order for the micro-frontend application 106 to perform its functionality for the host application 104, the micro-frontend application 106 is integrated into the host application 104. For example, the host application 104 can load the micro-frontend application 106 during runtime execution of the host application 104 to allow the micro-frontend application 106 to perform its functionality. For example, in many embodiments, the micro-frontend application 106 may be built as an independent component that may be integrated with the host application 104, by having the host application 104 load the micro-frontend application 106, or a portion thereof, into its document object model (DOM), and executed as a part of the host application 104 on the browser 102 during runtime execution of the host application 104. Details of the loading process will be discussed further below.

In some embodiments, the client device 122 can coupled to a cloud computing environment 110 via a network 108. The cloud computing environment 110 may be part of a backend computing infrastructure, including a server infrastructure, of a company or institution. The cloud computing environment 110 may be a public or private cloud service. Examples of a public cloud include, without limitation, Amazon Web Services (AWS), IBM Cloud, Oracle Cloud Solutions, Microsoft Azure Cloud, and Google Cloud. A private cloud refers to a cloud environment similar to a public cloud with the exception that it is operated solely for a single organization.

The cloud computing environment 110 can couple to the client device 122 to allow the host application 104 and the micro-frontend application 106 to function. For example, in many embodiments, both the client device 122 and the cloud computing environment 110 can have at least a portion of the host application 104 and the micro-frontend application 106 installed thereon as instructions on a non-transitory computer readable medium. The client device 122 and the cloud computing environment 110 can both execute the portions of the host application 102 and the micro-frontend application 106 using client-server architectures, to allow for their functionalities.

In some embodiments, the cloud computing environment 110 can comprise a variety of centralized or decentralized computing devices. For example, the cloud computing environment 110 may include a mobile device, a laptop computer, a desktop computer, grid-computing resources, a virtualized computing resource, cloud computing resources, peer-to-peer distributed computing devices, a server, a server farm, or a combination thereof. The cloud computing environment 110 may be centralized in a single room, distributed across different rooms, distributed across different geographical locations, or embedded within the network 108. While the devices comprising the cloud computing environment 110 can couple with the network 108 to communicate with the client device 122, the devices of the cloud computing environment 110 can also function as stand-alone devices separate from the client device 122.

In some aspects, the network 108 refers to a telecommunications network, such as a wired or wireless network. The network 108 can span and represent a variety of networks and network topologies. For example, the network 108 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 108. Cable, Ethernet, digital subscriber line (DSL), fiber optic lines, fiber to the home (FTTH), and plain old telephone service (POTS) are examples of wired communication that may be included in the network 108. Further, the network 108 can traverse a number of topologies and distances. For example, the network 108 can include a direct connection, personal area network (PAN), local area network (LAN), metropolitan area network (MAN), wide area network (WAN), or a combination thereof. For illustrative purposes, in the embodiment of FIG. 1, the system 100 is shown with the client device 122 and the cloud computing environment 110 as end points of the network 108. This, however, is exemplary and it is understood that the system 100 can have a different partition between the client device 122, the cloud computing environment 110, and the network 108. For example, the client device 122 and the cloud computing environment 110 can also function as part of the network 108.

In some embodiments, the cloud computing environment 110 can have components that allow the system 100 to function. In many embodiments, these can include at least the micro-frontend container 112, the micro-frontend application web component 114, the micro-frontend application BFF 116, the API gateway 118, and the micro-frontend API 120.

In some aspects, the micro-frontend container 112 refers to a location within a service of the cloud computing environment 110 that stores, packages, and executes portions of the micro-frontend application 106 to allow the micro-frontend application 106 to function. By way of example, if the cloud computing environment 110 is Amazon AWS™, the micro-frontend container 112 may be implemented as an Amazon Elastic Compute Cloud (EC2) instance to store, package, and execute portions of the micro-frontend application 106. In another example, if the cloud computing environment 110 is Google Cloud™, the micro-frontend container 112 may be implemented in Google Compute Engine and Google App Engine to store, package, and execute portions of the micro-frontend application 106. In another example, if the cloud computing environment 110 is Microsoft Azure™, the micro-frontend container 112 may be implemented in Azure Virtual Machines to store, package, and execute portions of the micro-frontend application 106.

In some embodiments, the micro-frontend container 112 can store the micro-frontend application web component 114 and the micro-frontend application BFF 116. The micro-frontend application web component 114 can refer to a portion of the code of the micro-frontend application 106 that is stored on the cloud computing environment 110. The micro-frontend application BFF 116 can refer to a layer between the micro-frontend application 106 and the cloud computing resources or APIs it calls on to facilitate the functioning of the micro-frontend application 106. For example, in many embodiments where the micro-frontend application 106, or a portion thereof (e.g., the micro-frontend application web component 114), requests data from a service of the cloud computing environment 110, the micro-frontend application BFF 116 can provide a layer between the micro-frontend application 106 and the service of the cloud computing environment 110 to facilitate the exchange of data. The purpose of the micro-frontend application BFF 116 may be to allow the micro-frontend application 106 to communicate with other components of the cloud computing environment 116. The use of the micro-frontend application BFF 116 is optional. In a variety of embodiments, the micro-frontend application 106 may be designed to make calls to the services of the cloud computing environment 110 directly. In some aspects, the micro-frontend application BFF 116 is used when implementing the system 100 because it allows for a layer of abstraction between the micro-frontend application 106 and the services of the cloud computing environment 110, so that if changes occur to the services which the micro-frontend application 106 calls, only the reference to the service in the micro-frontend application BFF 116 needs to be changed. As a result, the micro-frontend application 106 itself does not have to be modified, recompiled, tested, and redeployed.

In some embodiments, to perform its functionality, the micro-frontend application 106, or a portion thereof (e.g., the micro-frontend application web component 114), can access the micro-frontend API 120, which is the interface to the functions of the micro-frontend application 106 that enables the functionality of the micro-frontend application 106. The micro-frontend application API 120 may be accessed via the API gateway 118. The API gateway 118 can refer to a service of the cloud computing environment 110 that facilitates the exchange of information between the portions of the micro-frontend application 106 on the client device 122, the micro-frontend application web component 114, or a combination thereof, with the micro-frontend API 120. In some aspects, the API gateway 118 functions to add a layer of security and to facilitate data exchange between these components. The API gateway 118 can facilitate data and protocol translations where necessary to ensure intended information is exchanged between the portions of the micro-frontend application 106 on the client device 122, the micro-frontend application web component 114, and the micro-frontend API 120.

Figure 2:
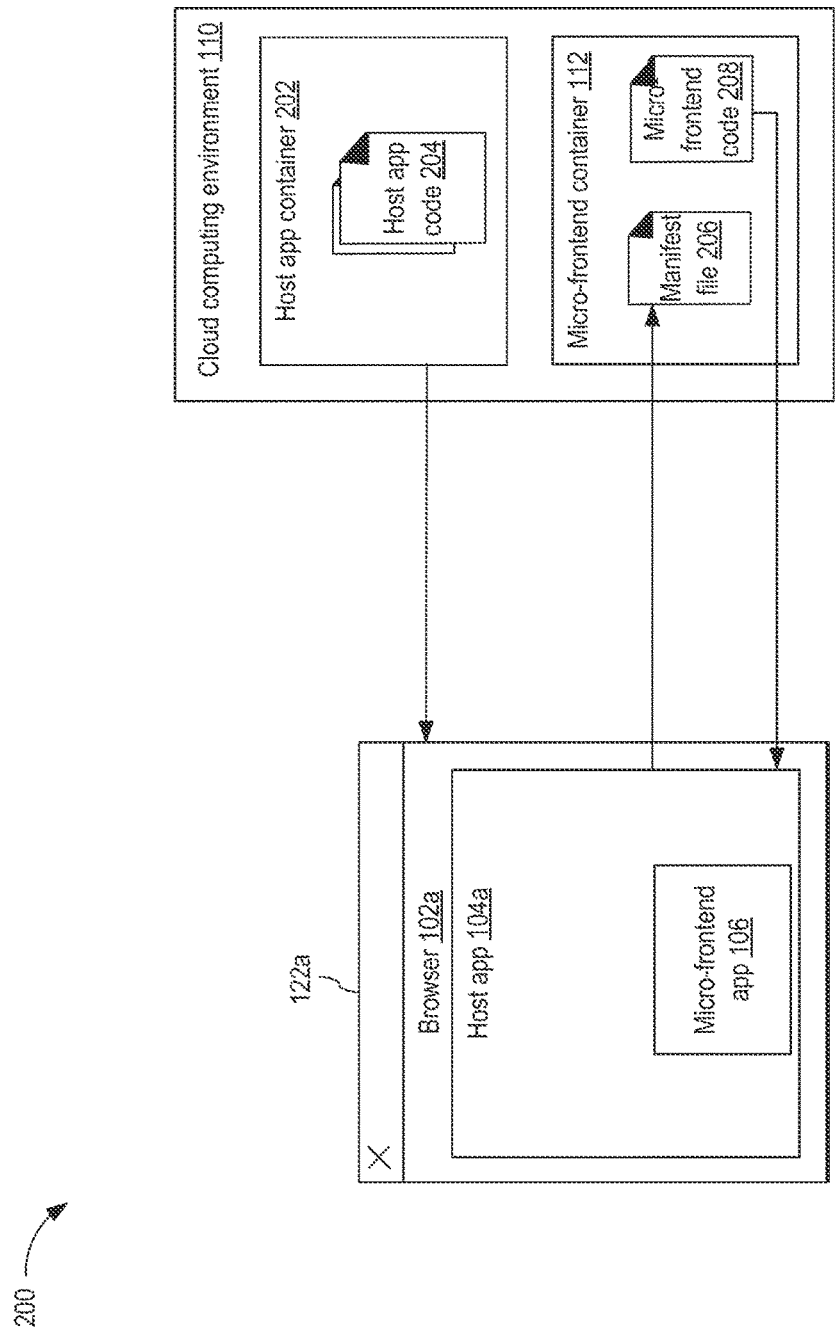
FIG. 2 is an example control flow for the system according to embodiments.

FIG. 2 is an example control flow 200 according to some embodiments. Control flow 200 will be described with respect to a host application {104a} on a client device {122a}, however, this is for ease of description. Control flow 200 may be applied to any other host application 104 on any other client device 122. Control flow 200 describes an exemplary process by which the micro-frontend application 106, or a portion thereof, is loaded onto host application 104a at runtime of host application 104a.

In some aspects, control flow 200 may begin with cloud computing environment 110 transmitting to client device 122a the host application 104a. In many embodiments, the transmitting may be the result of a user requesting download of the host application 104a onto browser 102a. As a result of the download, host application 104a may be stored and installed on browser 102a. In many embodiments, the download may be from a host application container 202 of the cloud computing environment 110. The host application container 202, similar to the micro-frontend container 112, can refer to a location within a service of the cloud computing environment 110 that stores, packages, and executes portions of host application code 204 to allow the host application 104a to function. Host application code 204 refers to the software code of the host application 104 (in this case host application 104a).

In some embodiments, once the host application 104a is downloaded, stored, and installed on browser 102a, the host application 104a, or a portion thereof, can persist (i.e., remain on browser 102a) until it is ready to be executed. In many embodiments, a user can execute the host application 104a by pressing a button or icon on the browser to execute the host application 104a to perform its functions. In a variety of embodiments, the host application 104a may be executed if the user searches the web for a domain or website, that once connected to via the browser 102a, can cause the browser 102a to execute the host application 104a.

Regardless of how the host application 104a is executed, in many embodiments, during the execution of the host application 104a, the host application 104a can generate a request to load the micro-frontend application 106 onto the browser 102a at runtime. Runtime can refer to the time at which the host application 104a is initiated to be executed. The request can take the form of a signal or API call to the cloud computing environment 110. Once generated, the request may be transmitted to the cloud computing environment 110. In many embodiments the request may be received by the micro-frontend container 112. In many embodiments, once received by the cloud computing environment 110, and based on receiving the request, the cloud computing environment 110 can execute a software script to access a manifest file 206 indicating a version of the micro-frontend application 106 to be loaded onto the browser 102a. The manifest file 206 can also indicate the location where the version of the micro-frontend application 106 to be loaded onto the browser 102a may be accessed. An example software script that the cloud computing environment 110 can execute is shown below:

```
// Fetch micro-frontend manifest to get latest version
//URL: /mfe/version-manifest.json
{"micro-frontend.js": "micro-frontend-summary-mfe-0.62.10.js"
}
```

In the above script, "micro-frontend-summary-mfe-0.62.10.js" indicates the version of the micro-frontend application 106 to be loaded.

In some embodiments, the manifest file 206 refers to a computer readable file, such as a text file, XML, JavaScript Object Notation (JSON) file, or similar file, that stores the location and version of the micro-frontend application 106 to be loaded onto the browser 102a. In many embodiments, the manifest file 206 may be stored in the micro-frontend container 112 from where it may be accessed. The primary purpose of the manifest file 206 is to indicate what version of the micro-frontend application 106 is to be loaded onto the browser 102a. The use of the manifest file 206 benefits the system 100 and provides the system 100 a more robust architecture by allowing an administrator to control what version of the micro-frontend application 106 is loaded onto the browser 102a and from where, directly from within the cloud computing environment 110. By using the manifest file 206, rather than having the host application 104a directly search for the version and location of the micro-frontend application 106 to be loaded, the host application 104a can instead make a call to the manifest file 206 and have the cloud computing environment 110 handle these tasks. This offloading of responsibility has several benefits.

In some embodiments, using the manifest file 206 in this manner allows the system 100 to be designed in a way where the host application 104a no longer has to search for and locate the correct version of the micro-frontend application 106 to be loaded onto the browser 102a. Current systems implement architectures where host application 104a performs this searching and locating functionality, resulting in the host application 104a having to be updated each time a version of the micro-frontend application 106 is updated. This is because the code to do the searching and locating is often hard-coded in the host application 104a and has to be updated by the developer of the host application 104a.

In some embodiments, the system 100 allows the host application 104a to offload the functionality of searching for and locating the correct version of the micro-frontend application 106 to the cloud computing environment 110. In some aspects, the host application 104a no longer has to be updated with version and location information of the micro-frontend application 106 each time the micro-frontend application 106 is updated. Having to update the host application 104a in this manner would require the host application 104a to be tested and recompiled each time the micro-frontend application 106 is updated to ensure proper functionality, causing significant disruptions in the running of the host application 104a each time the micro-frontend application 106 is updated.

In some embodiments, using the manifest file 206 in this manner allows the host application 102a to no longer have to be updated, tested, and recompiled each time the micro-frontend application 106 is updated. This can reduce the need to coordinate between development teams working on host applications 102 that use the micro-frontend application 106, and teams working on the micro-frontend application 106, because all development teams may be sure that they are calling the a micro-frontend application 106 that has been tested simply by referencing the manifest file 206 to access the micro-frontend application 106. In some aspects, each team can perform its development of the application they are responsible for without interfering with one another. In some aspects, because development teams no longer have to coordinate, time is saved developing both host applications 102 and the micro-frontend application 106.

In some embodiments, using the manifest file 206 in this manner allows better version control over the micro-frontend application 106 because it allows the micro-frontend application 106 to be deployed based on a reference to one file (the manifest file 206), which is easier to manage than having to manage references across each host application 104 to the micro-frontend application 106. This can also allow for an efficient scaling of software development activities when more than one host application 104 wants to use the same micro-frontend application 106.

In some embodiments, once the manifest file 206 is accessed, the cloud computing environment 110, or a component thereof, determines what version of the micro-frontend application 106 to transmit to the client device 122a for loading onto the browser 102a, and where to find that version. The cloud computing environment 110, or components thereof, can retrieve the micro-frontend application 106, by for example, retrieving the micro-frontend code 208 and transmitting the same to the client device 122a to load onto the browser 102a and be executed in conjunction with the host application 104a. The micro-frontend code 208 can refer to the software code implementing the micro-frontend application 208, or an executable containing the compiled version of the micro-frontend code 208, that may be transmitted to the host application 104a for execution with the host application 104a.

In many embodiments, when transmitted to the host application 104, the micro-frontend code 208 may be added to a DOM of the host application 104a, to be executed with the host application 104a. The DOM can refer to a cross-platform and language-independent interface that treats a document, such as a XML or HTML document, as a tree structure, wherein each node is an object representing a part of the document. The DOM can represent a document with a logical tree. In some aspects, each branch of the tree ends in a node, and each node contains objects. In some aspects, DOM methods allow programmatic access to the tree; with them one can change the structure, style or content of a document. Nodes can have event handlers attached to them. Once an event is triggered, the event handlers may be executed. In some embodiments, the host application 104a has a DOM associated with it, and by executing the event handlers in the DOM the host application 104a may be executed. Thus, the micro-frontend code 208 may be executed in this manner, by being added to a DOM of the host application 104a to be executed with the host application 104a. An example software script that may be executed to add the micro-frontend code 208 to the DOM of the host application 104a is shown below:

```
<!--3. Add the micro-frontend script to DOM: -->
<script
  src = https://example.com/mfe/micro-frontend-summary-mfe-0.62.10.js
  id = "micro-frontend-summary-mfe-script">
</script>
```

In the above script, "micro-frontend-summary-mfe-0.62.10.js" indicates the version of the micro-frontend application 106 to be added.

In some embodiments, the control flow 200 can proceed in a similar manner for any host application 104 wishing to use the micro-frontend application 106. In many embodiments, in the event that the micro-frontend application 106 is updated by a developer, the manifest file 206 may be updated with the new version of the micro-frontend application 106. In many embodiments, this may be done by a service of the cloud computing environment 110, which can obtain the version information from a repository where the updated code of the micro-frontend application 106 is stored, and update the manifest file 206 with the version and location information of the updated code of the micro-frontend application 106. In this way, the cloud computing environment 110 knows where to find the version of the micro-frontend application 106 to load into host application 104 if requests are made by the host application 104 to load the micro-frontend application 106.

In some embodiments, cache busting may be implemented using the manifest file 206. Cache busting may be implemented to enable the host application 104 to fetch the latest version of the micro-frontend application 106. By way of example, by default browsers (e.g., browser 102) can cache static files so that the files are downloaded once on the initial request, but on subsequent requests they are loaded directly from cache. In some embodiments, this can save time when loading files if they are used frequently. In some embodiments, when new versions of the files are deployed on servers, browsers will still use the old versions stored in cache when loading the files instead of new versions from servers, which may cause problems. In some embodiments, cache busting can be used to resolve this problem. For example, cache busting uses a unique file version identifier in the file name to tell browsers that a new version of the files are available. Therefore, browsers will not retrieve old files from cache but rather make a request to servers for the new file based on the file names.

In many embodiments, cache busting may be used to add a unique file version identifier to the name of the manifest file 206, alerting the system 100 that a new version of the micro-frontend application 106 is available. By way of example, in many embodiments implementing cache busting, when the host application 104 initially requests the micro-frontend application 106 be loaded, and a request is generated for the micro-frontend application 106, the manifest file 206 may be accessed using the aforementioned processes with respect to FIG. 2, to obtain the micro-frontend code 208. In many embodiments, based on the request, the micro-frontend code 208 can be transmitted to the browser 102. In many embodiments, the micro-frontend code 208 can then be cached in the browser 102 cache for subsequent use. However, in many embodiments implementing cache busting, the browser 102 may be instructed not to cache the manifest file 206 itself, thus ensuring that when the host application 104 subsequently requests the micro-frontend application 106 to be loaded, a request is made to the cloud computing environment 110 to access a manifest file 206 which indicates what version of the micro-frontend application 106 to use. In many embodiments, Cache-Control HTTP headers can be used to instruct the browser 102 never to cache the manifest file 206.

In many embodiments, for subsequent requests made by the host application 104, the system 100 can again access the manifest file 206 on the cloud computing environment 110, but based on name of the manifest file 206 quickly determine whether to transmit the micro-frontend code 208 again or have the use the micro-frontend code 208 cached on the browser 102 to be used by the host application 102. This can be achieved because the unique file version identifier to the name of the manifest file 206 will indicate whether the version of the micro-frontend application 106 is the same as that stored in the browser 102 cache or is a new version. If the unique file version identifier to the name of the manifest file 206 does not match the name of a previous version transmitted to the browser, a new version of the micro-frontend code 208 can be transmitted to the browser 102 to be loaded with the host application 104.

In some embodiments, the aforementioned control flow 200 may be performed by the modules, units, or services, of the client device 122a, or any other client device 122 on which a host application 104 is stored on, and cloud computing environment 110, and may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100, or installed as a removable portion of the system 100.

Methods of Operation

Figure 3:
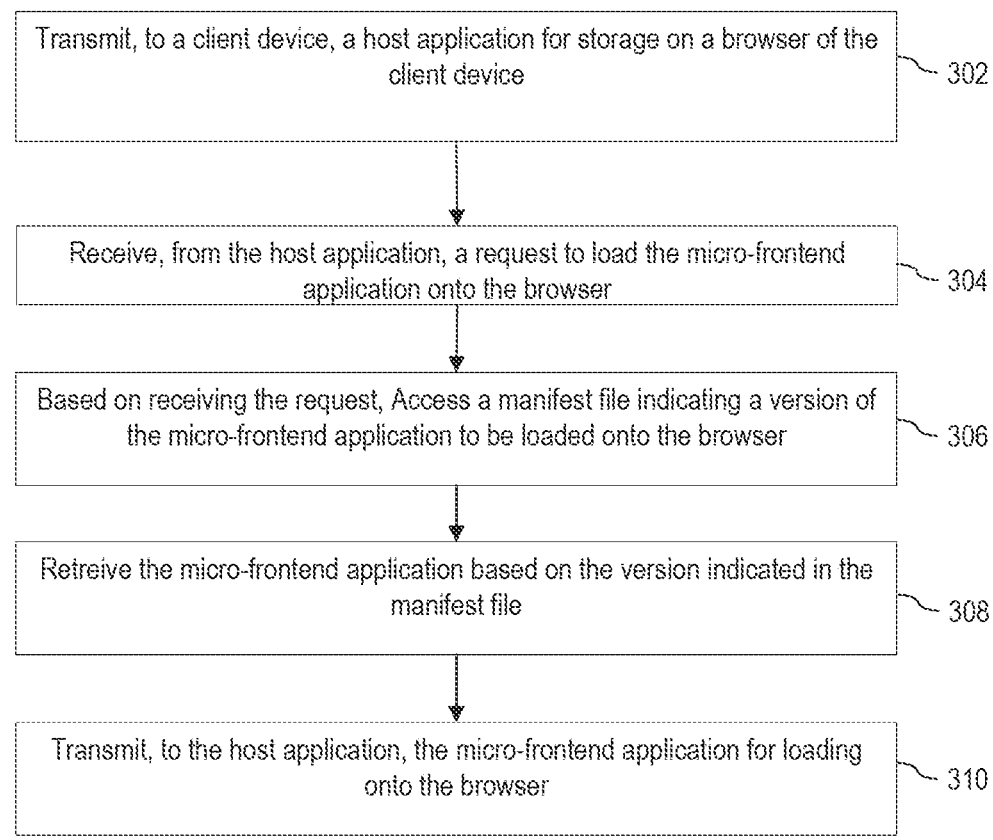
FIG. 3 is an example method of operating the system according to embodiments.

FIG. 3 is an example method 300 according to some embodiments. In some aspects, method 300 can operate in a cloud computing environment 110. Method 300 can, transmit, by one or more computing devices and to a client device (e.g., client device 122a), a host application (e.g., host application 104a), for storage on a browser (e.g., browser 102a) of the client device 122a. The host application 104a is used to facilitate loading of a micro-frontend application 106 onto the browser 102a at runtime of the host application 104a, for integration with and use in conjunction with the host application 104a, as shown in 302. In some aspects, method 300 further has the cloud computing environment 110 receive, by the one or more computing devices and from the host application 104a, a request to load the micro-frontend application 106 onto the browser 102a, as shown in 304. Based on receiving the request, the cloud computing environment 110 can access, by the one or more computing devices, a manifest file 206 indicating a version of the micro-frontend application 106 to be loaded onto the browser 102a, as shown in 306. The cloud computing environment 110 can retrieve, by the one or more computing devices, the micro-frontend application 106 based on the version indicated in the manifest file 206, as shown in 308, and transmit to the host application 104a, the micro-frontend application 106 for loading onto the browser 102a, as shown in 310.

Figure 4:
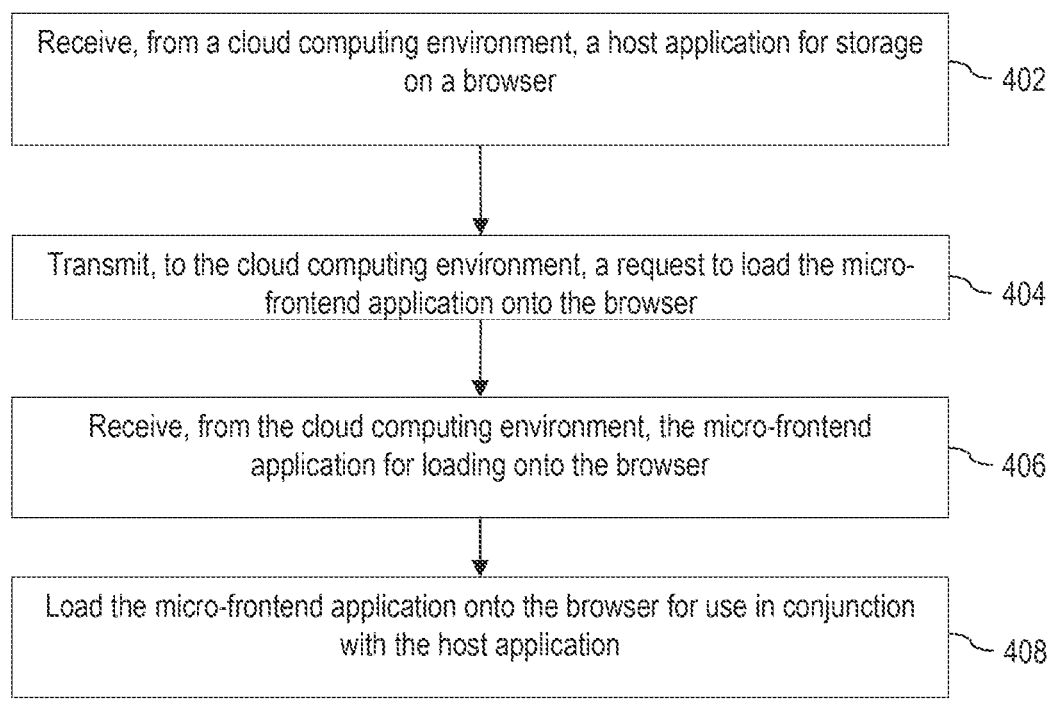
FIG. 4 is a further example method of operating the system according to embodiments.

FIG. 4 is a further example method 400 according to some embodiments. In some aspects, method 400 has the client device 122a, receive, by one or more computing devices and from a cloud computing environment 110, a host application (e.g., host application 104a) for storage on a browser (e.g., browser 102a). The host application 104a may be used to facilitate loading of a micro-frontend application 106 onto the browser 102a at runtime of the host application 104a, for integration with and use in conjunction with the host application 104a, as shown in 402. In some aspects, method 400 has the client device 122a transmit, by the one or more computing devices and to the cloud computing environment 110, a request to load the micro-frontend application onto the browser 102a, as shown in 404. Method 400 can have the client device 122a receive, by the one or more computing devices and from the cloud computing environment 110, the micro-frontend application 106 for loading onto the browser 102a, as shown in 406, and load, by the one or more computing devices, the micro-frontend application 106 onto the browser 122a for use in conjunction with the host application 104a, as shown in 408.

In some embodiments, operation of methods 300 and 400 are performed, for example, by system 100, in accordance with embodiments described above.

Deployment of the Micro-Frontend Application and Micro-Frontend BFF

Figure 5:
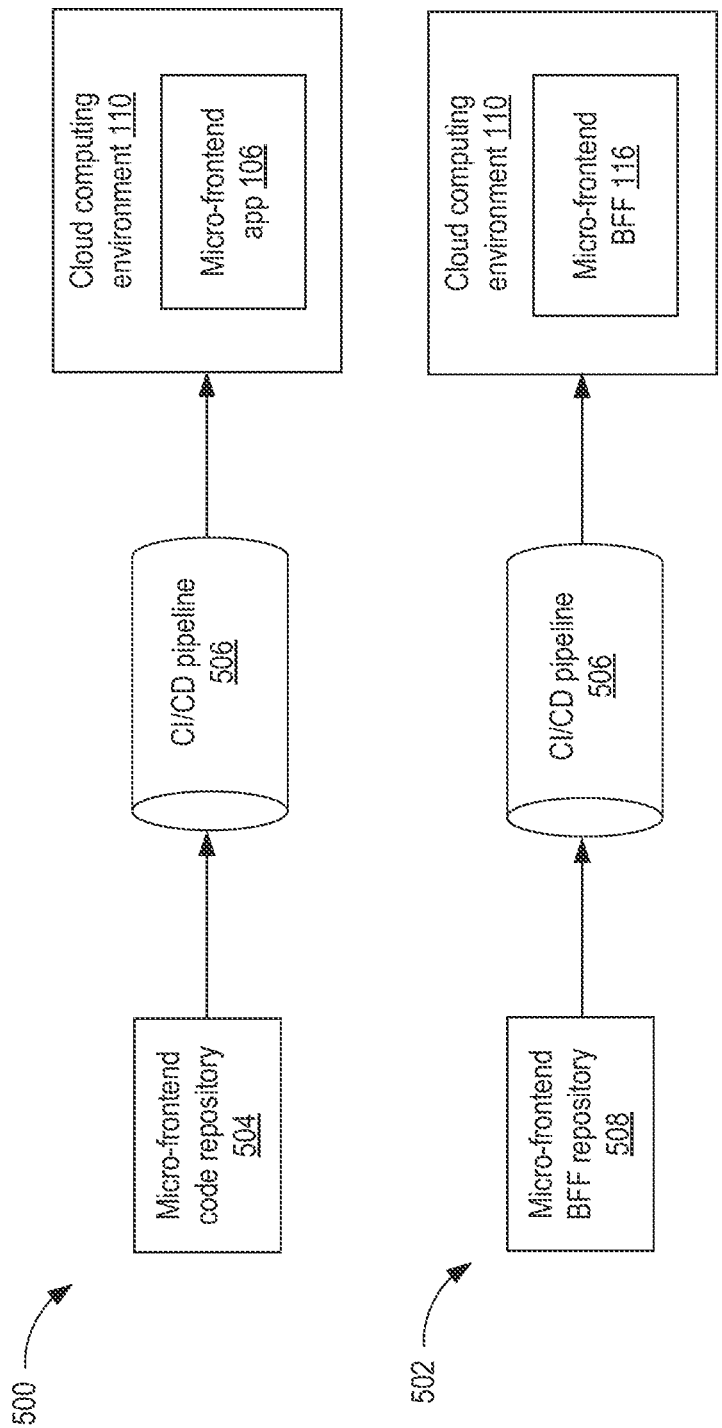
FIG. 5 are example deployment pipelines for a micro-frontend application and a micro-frontend backend for frontend that are used in the system according to embodiments.

FIG. 5 are example deployment pipelines 500 and 502 in the system 100 according to some embodiments. For example, deployment pipelines 500 and 502 may be used in micro-frontend application 106 and micro-frontend application BFF 116 in system 100. In some aspects, deployment pipelines 500 and 502 refer to the process by which the micro-frontend application 106 and the micro-frontend application BFF 116 are deployed to the cloud computing environment 110, to be used by the system 100.

In some embodiments, deployment pipelines 500 and 502 show the micro-frontend application 106 and micro-frontend BFF application 116 first having their software code implemented in a micro-frontend code repository 504 and a micro-frontend application BFF repository 508. In some aspects, the repositories refer to any environment in which the software code implementing the micro-frontend application 106 and the micro-frontend application BFF 116 are developed.

In some embodiments, the code for the micro-frontend application 106 and the micro-frontend application BFF 116 are passed through a CI/CD pipeline 506. In some aspects, CI/CD pipeline 506 refers to the combined practices of continuous integration and either continuous delivery or continuous deployment of software code. In some aspects, CI/CD pipeline 506 bridges the gaps between development, operation activities, and development teams, by enforcing automation in building, testing and deployment of applications. Modern day software development practices involve continuous development, continuous testing, continuous integration, continuous deployment and continuous monitoring of software applications throughout its development life cycle. This may be done through the CI/CD pipeline 506.

In some embodiments, both the code for the micro-frontend application 106 and the micro-frontend application BFF 116 are passed through the CI/CD pipeline 506. Once the code for the micro-frontend application 106 and the micro-frontend application BFF 116 pass through the CI/CD pipeline 506, they are then deployed to the cloud computing environment 110 to, for example, the micro-frontend container 112 to be used in a production environment to use in the system 100.

Components of the System

FIG. 6 is an example architecture 600 of components implementing, e.g., systems in FIGS. 1, 4, and/or 5, according to embodiments. The components may be implemented by any of the devices of the system 100, for example the client device 122 or the cloud computing environment 110. In many embodiments, the components may include a control unit 602, a storage unit 606, a communication unit 616, and a user interface 612. The control unit 602 may include a control interface 604. The control unit 602 may execute a software 610 to provide some or all of the intelligence of system 100. The control unit 602 may be implemented in a number of different ways. For example, the control unit 602 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 604 may be used for communication between the control unit 602 and other functional units or devices of system 100. The control interface 604 may also be used for communication that is external to the functional units or devices of system 100. The control interface 604 may receive information from the functional units or devices of system 100, or from remote devices 620, or may transmit information to the functional units or devices of system 100, or to remote devices 620. The remote devices 620 refer to units or devices external to system 100.

The control interface 604 may be implemented in different ways and may include different implementations depending on which functional units or devices of system 100 or remote devices 620 are being interfaced with the control unit 602. For example, the control interface 604 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 604 may be connected to a communication infrastructure 622, such as a bus, to interface with the functional units or devices of system 100 or remote devices 620.

The storage unit 606 may store the software 610. For illustrative purposes, the storage unit 606 is shown as a single element, although it is understood that the storage unit 606 may be a distribution of storage elements. Also for illustrative purposes, the storage unit 606 is shown as a single hierarchy storage system, although it is understood that the storage unit 606 may be in a different configuration. For example, the storage unit 606 may be formed with different storage technologies forming a memory hierarchical system including different levels of caching, main memory, rotating media, or off-line storage. The storage unit 606 may be a volatile memory, a nonvolatile memory, an internal memory, an external memory, or a combination thereof. For example, the storage unit 606 may be a nonvolatile storage such as nonvolatile random access memory (NVRAM), Flash memory, disk storage, or a volatile storage such as static random access memory (SRAM) or dynamic random access memory (DRAM).

The storage unit 606 may include a storage interface 608. The storage interface 608 may be used for communication between the storage unit 606 and other functional units or devices of system 100. The storage interface 608 may also be used for communication that is external to system 100. The storage interface 608 may receive information from the other functional units or devices of system 100 or from remote devices 620, or may transmit information to the other functional units or devices of system 100 or to remote devices 620. The storage interface 608 may include different implementations depending on which functional units or devices of system 100 or remote devices 620 are being interfaced with the storage unit 606. The storage interface 608 may be implemented with technologies and techniques similar to the implementation of the control interface 604.

The communication unit 616 may enable communication to devices, components, modules, or units of system 100 or to remote devices 620. For example, the communication unit 616 may permit the system 100 to communicate between the client device 122 and the cloud computing environment 110. The communication unit 616 may further permit the devices of system 100 to communicate with remote devices 620 such as an attachment, a peripheral device, or a combination thereof through the network 108.

As previously indicated, the network 108 may span and represent a variety of networks and network topologies. For example, the network 108 may include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 108. Cable, Ethernet, digital subscriber line (DSL), fiber optic lines, fiber to the home (FTTH), and plain old telephone service (POTS) are examples of wired communication that may be included in the network 108. Further, the network 108 may traverse a number of network topologies and distances. For example, the network 108 may include direct connection, personal area network (PAN), local area network (LAN), metropolitan area network (MAN), wide area network (WAN), or a combination thereof.

The communication unit 616 may also function as a communication hub allowing system 100 to function as part of the network 108 and not be limited to be an end point or terminal unit to the network 108. The communication unit 616 may include active and passive components, such as microelectronics or an antenna, for interaction with the network 108.

The communication unit 616 may include a communication interface 618. The communication interface 618 may be used for communication between the communication unit 616 and other functional units or devices of system 100 or to remote devices 620. The communication interface 618 may receive information from the other functional units or devices of system 100, or from remote devices 620, or may transmit information to the other functional units or devices of the system 100 or to remote devices 620. The communication interface 618 may include different implementations depending on which functional units or devices are being interfaced with the communication unit 616. The communication interface 618 may be implemented with technologies and techniques similar to the implementation of the control interface 604.

The user interface 612 may present information generated by system 100. In many embodiments, the user interface 612 allows a user to interface with the devices of system 100 or remote devices 620. The user interface 612 may include an input device and an output device. Examples of the input device of the user interface 612 may include a keypad, buttons, switches, touchpads, soft-keys, a keyboard, a mouse, or any combination thereof to provide data and communication inputs. Examples of the output device may include a display interface 614. The control unit 602 may operate the user interface 612 to present information generated by system 100. The control unit 602 may also execute the software 610 to present information generated by system 100, or to control other functional units of system 100. The display interface 614 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting methods and systems are cost-effective, highly versatile, and accurate, and may be implemented by adapting components for ready, efficient, and economical manufacturing, application, and utilization. Another important aspect of embodiments of the present disclosure is that it valuably supports and services the historical trend of reducing costs, simplifying systems, and/or increasing performance.

These and other valuable aspects of the embodiments of the present disclosure consequently further the state of the technology to at least the next level. While the disclosed embodiments have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the invention should be determined not by the embodiments illustrated, but by the appended claims and their equivalents.

What is claimed is:

1. A computer implemented method comprising:
    transmitting, by one or more computing devices and to a client device, a host software application;
    storing partially or fully, by the one or more computing devices, the host software application on a browser of the client device;
    executing, by the one or more computing devices, the host software application on the browser to facilitate loading of a micro-frontend software application onto the browser at runtime of the host software application, wherein the micro-frontend software application is loaded into a document object model (DOM) of the host software application and wherein the micro-frontend software application provides some specific functionality for the host software application;
    accessing, by the one or more computing devices, a manifest file indicating a version of the micro-frontend software application to be loaded onto the browser;
    retrieving, by the one or more computing devices, the micro-frontend software application based on the version indicated in the manifest file; and
    transmitting, by the one or more computing devices and to the host software application, the micro-frontend software application for loading onto the browser.

2. The computer implemented method of claim 1, wherein the transmitting the micro-frontend software application is from a cloud computing environment to the browser.

3. The computer implemented method of claim 1, wherein the transmitting the host software application is from a cloud computing environment to the browser.

4. The computer implemented method of claim 1, further comprising updating, by the one or more computing devices, the manifest file with a new version number of the micro-frontend software application each time the micro-frontend software application is updated.

5. The computer implemented method of claim 1, wherein the manifest file is implemented as a JavaScript Object Notation (JSON) file.

6. The computer implemented method of claim 1, wherein a portion of the host software application is installed on the client device and on the cloud-computing environment pursuant to a client-server architecture.

7. A non-transitory computer readable medium including instructions for causing a computing system to perform operations, the operations comprising:
- transmitting, by one or more computing devices and to a client device, a host software application;
- storing partially or fully, by the one or more computing devices, the host software application on a browser of the client device;
- executing, by the one or more computing devices, the host software application on the browser to facilitate loading of a micro-frontend software application onto the browser at runtime of the host software application, wherein the micro-frontend software application is loaded into a document object model (DOM) of the host software application and wherein the micro-frontend software application provides some specific functionality for the host software application;
- accessing, by the one or more computing devices, a manifest file indicating a version of the micro-frontend software application to be loaded onto the browser;
- retrieving, by the one or more computing devices, the micro-frontend software application based on the version indicated in the manifest file; and
- transmitting, by the one or more computing devices and to the host software application, the micro-frontend software application for loading onto the browser.

8. The non-transitory computer readable medium of claim 7, wherein the transmitting the micro-frontend software application is from a cloud computing environment to the browser.

9. The non-transitory computer readable medium of claim 7, wherein the transmitting the host software application is from a cloud computing environment to the browser.

10. The non-transitory computer readable medium of claim 7, wherein the operations further comprise updating, by the one or more computing devices, the manifest file with a new version number of the micro-frontend software application each time the micro-frontend software application is updated.

11. The non-transitory computer readable medium of claim 7, wherein the manifest file is implemented as a JavaScript Object Notation (JSON) file.

12. The non-transitory computer readable medium of claim 7, wherein a portion of the host software application is installed on the client device and on the cloud-computing environment pursuant to a client-server architecture.

13. A computing system comprising:
- a memory configured to store instructions;
- a communication unit including microelectronics, coupled to the memory and configured to process the stored instructions to:
  - transmit to a client device a host software application;
- a processor, coupled to the memory, configured to process the stored instructions to:
  - store partially or fully the host software application on a browser of the client device;
  - execute the host software application on the browser to facilitate loading of a micro-frontend software application onto the browser at runtime of the host software application, wherein the micro-frontend software application is loaded into a document object model (DOM) of the host software application and wherein and the micro-frontend software application provides some specific functionality for the host software application;
  - access a manifest file indicating a version of the micro-frontend software application to be loaded onto the browser;
  - retrieving the micro-frontend software application based on the version indicated in the manifest file; and
- wherein the communication unit is further configured to:
  - transmit to the host software application the micro-frontend software application for loading onto the browser.

14. The computing system of claim 13, wherein the communication unit is further configured to transmit the micro-frontend software application from a cloud computing environment to the browser.

15. The computing system of claim 13, wherein the communication unit is further configured to transmit the host software application from a cloud computer environment to the browser.

16. The computing system of claim 13, wherein the processor is further configured to update the manifest file with a new version number of the micro-frontend software application each time the micro-frontend software application is updated.

17. The computing system of claim 13, wherein the micro-frontend software application further comprises a micro-frontend backend for frontend (BFF) component for facilitating communications between the micro-frontend software application and cloud computing resources or APIs is called by the micro-frontend software application to facilitate functioning of the micro-frontend software application.

* * * * *